(12) United States Patent
Young et al.

(10) Patent No.: US 6,836,510 B2
(45) Date of Patent: Dec. 28, 2004

(54) DSL LINK WITH SCALEABLE PERFORMANCE

(75) Inventors: Whu-Ming Young, Palo Alto, CA (US); Ming-Kang Liu, San Jose, CA (US)

(73) Assignee: PCTEL, Inc., Chicago, IL (US)

( * ) Notice: Subject to any disclaimer, the term of this patent is extended or adjusted under 35 U.S.C. 154(b) by 0 days.

(21) Appl. No.: 10/054,410

(22) Filed: Nov. 13, 2001

(65) Prior Publication Data

US 2002/0061061 A1 May 23, 2002

Related U.S. Application Data

(63) Continuation of application No. 09/255,235, filed on Feb. 22, 1999, now Pat. No. 6,345,072.

(51) Int. Cl.[7] .................................. H04B 1/38
(52) U.S. Cl. ...................... 375/222; 370/501; 710/129
(58) Field of Search ................................ 375/220, 222, 375/295, 296, 346, 355, 257, 219; 370/236.1, 294, 395.53, 468, 485, 498, 501; 701/1, 126, 129

(56) References Cited

U.S. PATENT DOCUMENTS

| | | | |
|---|---|---|---|
| 5,297,231 A | | 3/1994 | Miller |
| 5,404,459 A | * | 4/1995 | Gulick et al. .................. 710/61 |
| 5,408,260 A | * | 4/1995 | Arnon ......................... 725/106 |
| 5,475,691 A | | 12/1995 | Chapman et al. |
| 5,532,556 A | * | 7/1996 | Anderson et al. ............. 375/356 |
| 5,606,577 A | * | 2/1997 | Grube et al. ................. 375/295 |
| 5,680,394 A | * | 10/1997 | Bingham et al. ............ 370/294 |
| 5,724,413 A | | 3/1998 | Suffern et al. |
| 5,835,787 A | | 11/1998 | Raffman et al. |
| 5,852,631 A | | 12/1998 | Scott |
| 5,870,046 A | | 2/1999 | Johnson et al. |
| 5,931,929 A | * | 8/1999 | Tran et al. .................... 710/69 |
| 5,960,036 A | | 9/1999 | Johnson et al. |
| 5,970,066 A | | 10/1999 | Lowry et al. |
| 6,016,311 A | | 1/2000 | Gilbert et al. |
| 6,049,531 A | * | 4/2000 | Roy ....................... 370/395.53 |
| 6,055,268 A | * | 4/2000 | Timm et al. ................. 375/229 |
| 6,058,427 A | | 5/2000 | Viswanath et al. |
| 6,072,783 A | | 6/2000 | Riley |
| 6,128,317 A | | 10/2000 | Mackre |
| 6,145,039 A | | 11/2000 | Ajanovic et al. |
| 6,175,884 B1 | | 1/2001 | Harriman et al. |
| 6,216,170 B1 | | 4/2001 | Giovannoni et al. |
| 6,256,697 B1 | | 7/2001 | Ajanovic et al. |
| 6,269,103 B1 | | 7/2001 | Laturell |
| 6,269,156 B1 | | 7/2001 | Matt et al. |
| 6,272,563 B1 | | 8/2001 | Ajanovic et al. |
| 6,493,326 B1 | * | 12/2002 | Ramachandran ............. 370/311 |
| 6,529,479 B1 | * | 3/2003 | Suzuki ....................... 370/236.1 |
| 2001/0014927 A1 | | 8/2001 | Chang et al. |

FOREIGN PATENT DOCUMENTS

| | | |
|---|---|---|
| WO | WO 99/18754 | 4/1999 |
| WO | WO 00/19308 | 4/2000 |
| WO | WO 00/19617 | 4/2000 |

OTHER PUBLICATIONS

Alcatel, Data Sheet for MTC–20144, "Integrated ADSL CMOS Analog Front–End Circuit," Rev. 1—Dec. 1998, pp. 1–24.

* cited by examiner

*Primary Examiner*—Chieh M. Fan
(74) *Attorney, Agent, or Firm*—Farjami & Farjami LLP

(57) ABSTRACT

A digital communications link, protocol and related circuits are provided which achieve a scaleable performance rate through a combination of clock scaling and/or variable frame sizing. The system is used within a personal computer, thus allowing the latter to be interoperable with any number of different communications protocols, including xDSL based transmission standards, and to set up communications links of varying capacity and performance.

61 Claims, 6 Drawing Sheets

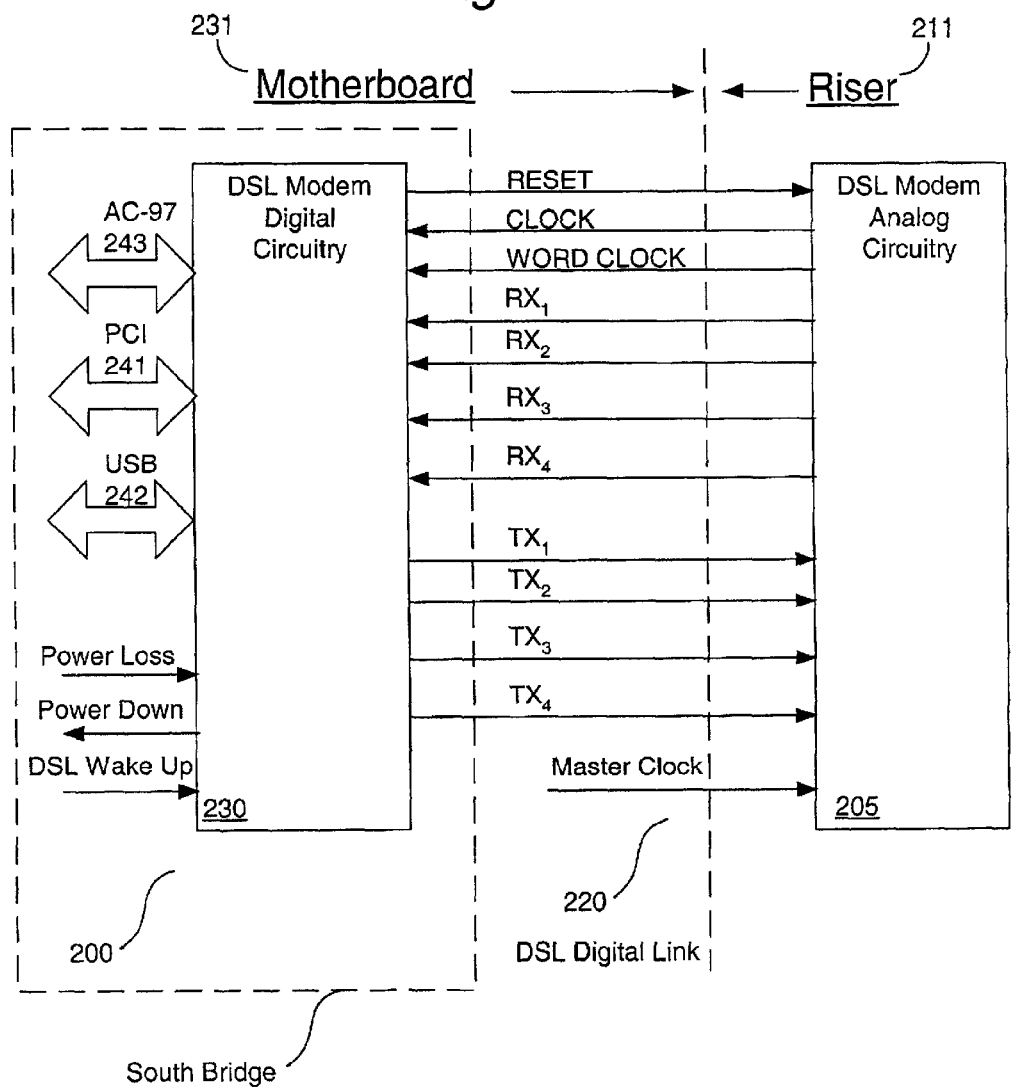

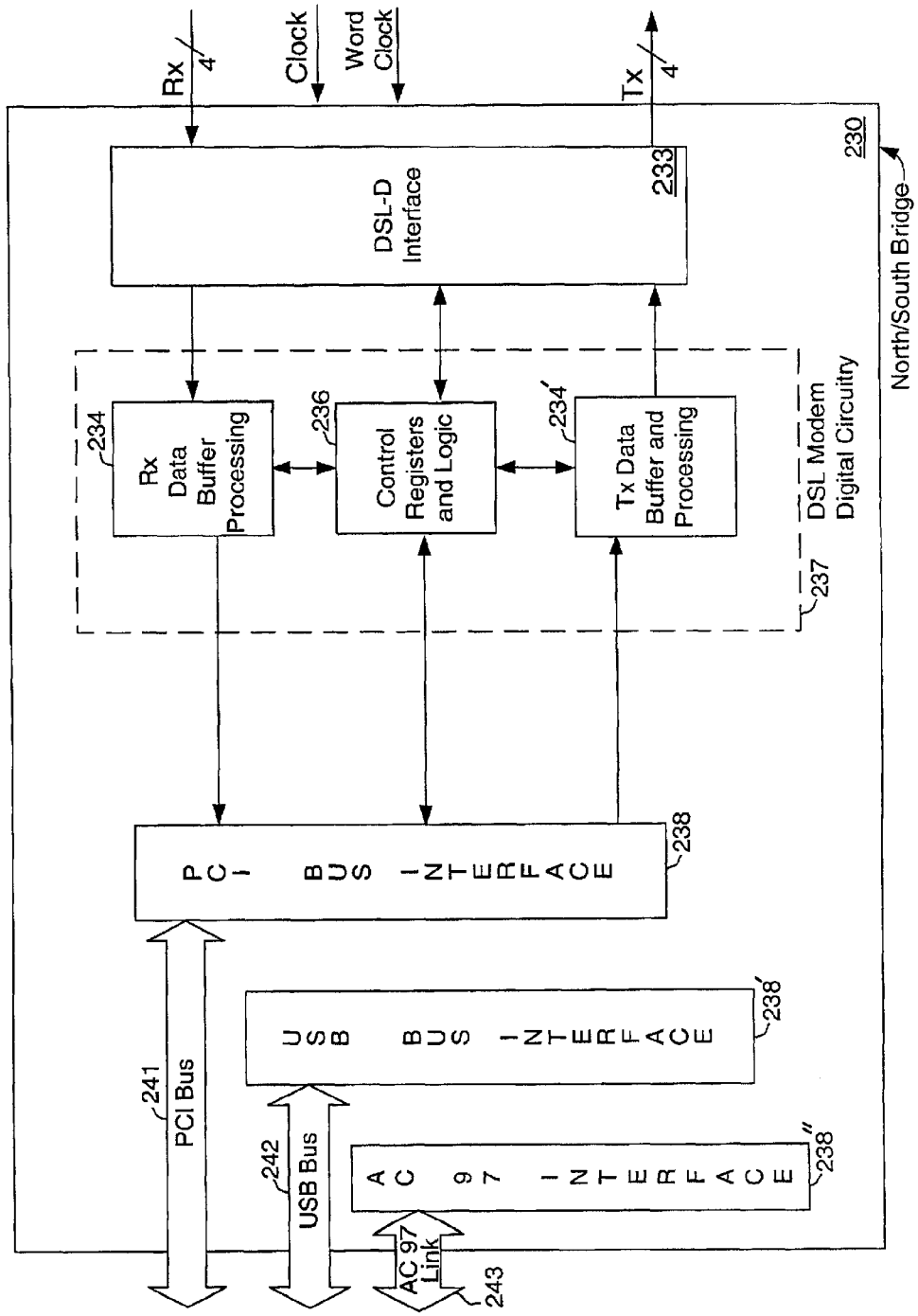
Fig. 2B-(Sheet 1)

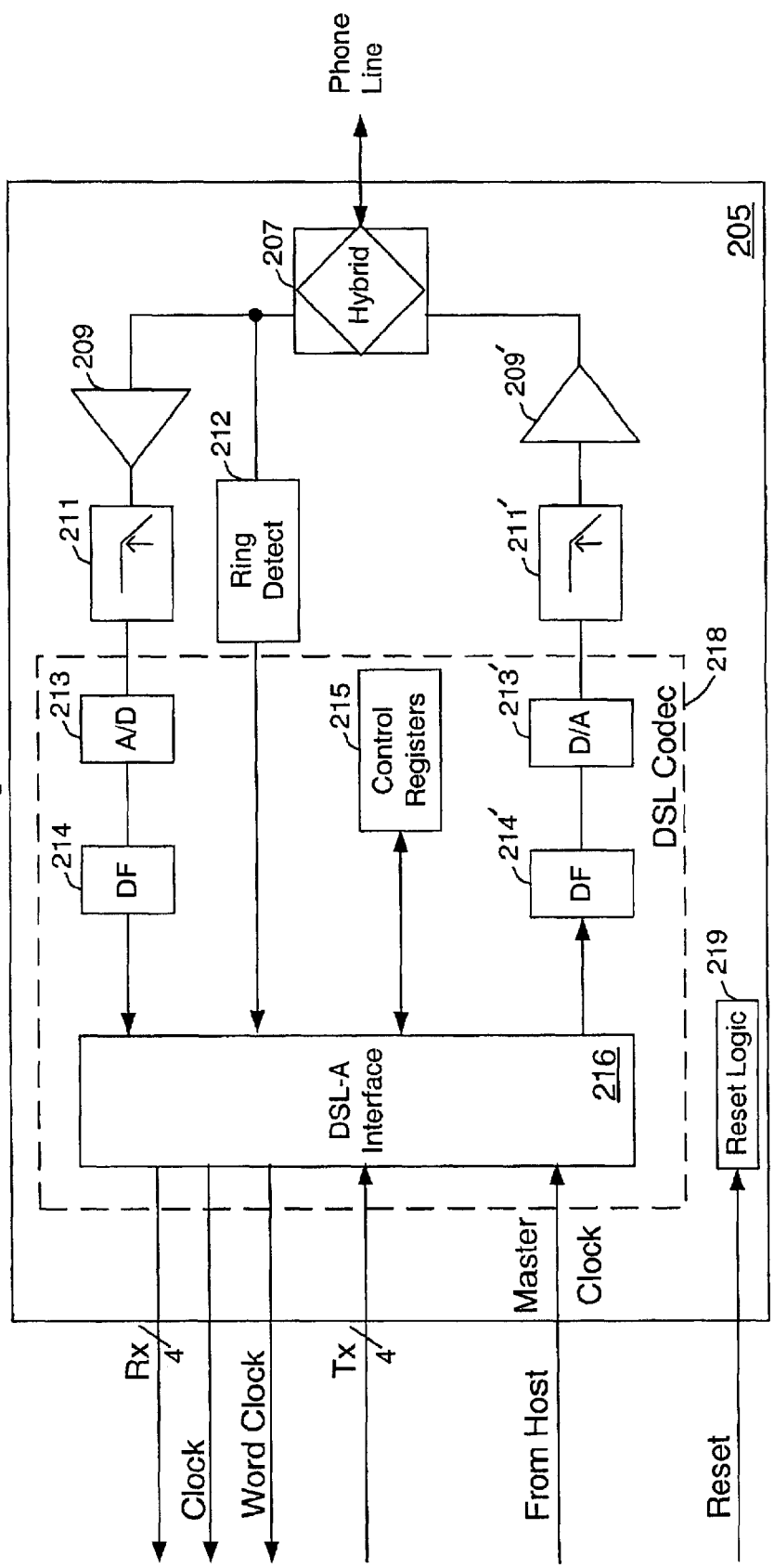
Fig. 2B-(Sheet 2)

*Fig. 4*

| DSL Link Pins | Cycle 1 | Cycle 2 | Cycle 3 | Cycle 4 |
|---|---|---|---|---|
| RxData[3:0] | Control, 0, RxClav,TxClav | RxSOC,RxAddr.[2:0] | RxData[7:4] | RxData[3:0] |
| TxData[3:0] | Control, 0, RxEnb,TxEnb | TxSOC,TxAddr.[2:0] | TxData[7:4] | TxData[3:0] |

DSL LINK WITH SCALEABLE PERFORMANCE

This application is a continuation of U.S. application Ser. No. 09/255,235, filed Feb. 22, 1999, now U.S. Pat. No. 6,345,072.

FIELD OF THE INVENTION

The invention relates generally to a digital subscriber line (DSL)-link interface and protocol for a DSL modem. The present invention has particular applicability to personal computer (PC) systems where the digital control and analog front end portions of such a DSL modem are not implemented in a single integrated circuit (IC) for various technical and cost-effective reasons.

BACKGROUND OF THE INVENTION

It has been consistent in the electronics industry that complex logic functions are integrated into smaller and smaller form factors. For instance, a popular growing trend is to combine audio and telephone capabilities in one device, including graphic and video functions in a computer chipset, and to integrate all computer peripheral functions into a single IO chip. A related general trend in the PC industry is the migration of more and more devices, components, functionality, etc. to the motherboard. This makes sense for a variety of engineering and cost reasons, including the fact that this approach conserves available conventional expansion slots on the system bus, is easier to configure, reduces the total mother board form factor and BOM cost, and preserves compatibility with legacy systems.

At the same time, there are certain components that are not optimally combined or tightly integrated together for a variety of reasons, some of which are engineering related, and some of which are regulatory related. As noted above there is considerable interest in placing a full scale modem down (directly on) the motherboard, to obtain the aforementioned benefits. From an engineering perspective, however, it is difficult to place the analog I/O portions of a modem directly on a motherboard because of various noise sources present on the latter. Therefore, the signal to noise ratio (SNR) performance of the modem system will decrease. Similarly, from a regulatory perspective, these analog portions of a modem must undergo a certification process in accordance with local applicable telecom rules and regulations before they can be implemented in a commercial product. If it were necessary to subject every motherboard to a new certification process (simply because it now incorporated some modem front end circuitry), this would impede and slow down the development of new products considerably.

Thus, there is a general perception in the industry at this time that, at least for the PC environment, it makes more sense to separate the analog and digital portions of a high speed modem. This has led to a proposal, authored by Intel Corporation, known as the Audio/Modem Riser Specification, in which it is suggested that the analog I/O portions of a modem be moved to a card that is physically separated but easily connected to a motherboard, Version 1.1 of this document, revised on Sep. 10, 1998, is available for downloading via the Internet at Intel's corporate web site, and is hereby incorporated by reference. In this specification, a portion of which is reproduced in FIG. 1A, it is proposed that the portions of the modem which are susceptible to noise, and which implicate certification issues, be moved to what is known as a Homologated Riser Card. This card has I/O connections to the outside world (i.e., such as to a conventional telephone line) but at the same time fits in a riser connector directly to the motherboard. As the specification indicates, this riser interface is preferably standardized, so the motherboard makers can implement audio/modem capability with lower BOM costs, and with fewer concerns about vendor proprietary variations (i.e., because there is a common footprint that can be stuffed with competing pin compatible implementations). The specification provides a detailed and comprehensive explanation of the electrical and physical requirements required to comply with the proposed standard.

As depicted in FIG. 1A, a modem 100 includes an analog I/O portion 110 located on a riser card 111. This analog I/O portion (sometimes referred to as a codec) is then interfaced through a digital link 120 (known as AC-97) to the digital controller 130 of the modem. The latter digital portion is located directly on a motherboard 131 and generally includes appropriate modem control circuitry, data pumps, and other functional circuits typically associated with those aspects of a modem. These functions can also be performed, for example, by a so-called host signal processing (HSP) embodiment, in which case the AC 97 digital controller (at least for the modem portions anyway) can consist of as little as a very simple bus interface. The preferred implementation for this digital portion is described in another specification published by Intel known as Audio Codec 97. Version 2.1 of this document, published on May 22, 1998, is likewise available for downloading at Intel's corporate web site, and is also hereby incorporated by reference. As noted therein, the AC97 digital controller can include a wide range of capabilities, including multiple digital audio channels, and suitable interfaces to a PCI bus, a digital $I^2S$ bus, etc.

A description of the various I/O control, and power/ground signals in the AC-97 link passing through the riser interface is provided at Tables 1–5 of the aforementioned A/M Riser specification. As seen generally in FIG. 1B, in a voice band modem implementation, the AC 97 link between the digital controller 130 and the analog CODEC 110 consists of a five wire, bi-directional, serial TDM format interface. The signals supported, include the following: RESET (a master hardware reset), BITCLK (12.288 MHz serial data clock), SYNC (48 KHz fixed rate sample sync), SDATA_OUT (serial, time division multiplexed input data stream to the PC), and SDATA_IN (serial, time division multiplexed output data stream from the PC). The format and nature of these signals is well-known, and is described in the aforementioned specifications. Digital controller 130 can also including suitable interfaces for other contemporary expansion busses, such as PCI bus 141, USB 142, etc.

While the A/M Riser specification is a step in the right direction, it does not provide for functionality that would permit implementation of an xDSL type modem at this time. For example, xDSL requires a much higher bit rate than that provided by the AC97 link (at a 2.2 MHz sampling and 16 bits wide for an ADSL downstream signal, the total bit rate is 35.2 Mb/s, which is much higher than the 12.288 MHz serial clock). Furthermore, there are various power and control signaling requirements in xDSL that were not foreseen by AC97. Therefore, the AC97 and A/M Riser specification are limited to supporting at most simple analog type (V.90 and the like) modems. This is a significant drawback, since xDSL technologies (and especially ADSL) are expected to be in widespread use in a very short time.

SUMMARY OF THE INVENTION

Accordingly, it is a general object of the present invention to overcome the aforementioned problems.

Another object of the present invention, is to provide a DSL modem which is configurable as a motherboard device within a personal computing system, in a manner similar to that only currently possible for voice band type modems;

A related object of the present invention is to provide a DSL modem that has analog codec circuitry and digital controller circuitry both tightly coupled to a PC motherboard, in a manner similar to that only current provided for voice band type modems;

Another object of the present invention is to provide a DSL interface that can properly handle DSL data rates, DSL control signals, and other xDSL related signal requirements so that it is suitable for linking the analog and digital portions of a DSL modem of the aforementioned type;

A related object of the present invention is to provide a DSL interface that is extremely flexible, and can be used in any one of a number of different xDSL technologies, including HDSL, SDSL, ADSL, reduced rate ADSL, etc.;

Another object of the present invention is to provide an improved signal protocol for a DSL link, having data/control word formatting and timing specifications especially suited for a DSL data stream;

A further object of the present invention is to provide a DSL interface that minimizes the required signal and power pins associated with a standardized specification for analog codec components in a personal computing system, and is therefore cost effective, and can be easily integrated by system vendors;

Yet a further object of the present invention, is to provide a DSL digital controller and a DSL codes which can utilize the above novel DSL interface;

An additional object of the present invention, is to provide a personal computer motherboard which is adapted to use the aforementioned DSL modem and DSL interface.

Another object of the present invention is to minimize the required logic complexity in order to support all above functions and features.

These and other objects are effectuated by the following aspects of the present invention.

An improved digital communications link of the present invention connects a digital controller section of an xDSL modem—which is preferably located on a system motherboard of a computing system—to a separate analog section of the xDSL modem—which is located at a position substantially free of electronic noise from other electronic components on said motherboard, which could materially affect the operation of such analog section. The data path/link is generally configured in the following manner: (a) a plurality of receive signal lines are set up for receiving data from a remote site; (b) a plurality of transmit signal lines are designated for transmitting data to remote site; (c) a bit clock signal line is set up for carrying a clock signal, which clock signal is used in connection with communicating the data to and from the remote site. The bit clock signal line can carry any desired clock signal needed according to data transmission requirements of said digital communications link, thus providing a scalable interface that is easily adaptable for use in any number of different motherboard environments.

An additional word clock signal, derived from the bit clock signal, marks the boundary for each sample word received or transmitted on said plurality of receive signal lines and/or plurality of transmit signal lines respectively.

Another aspect of the present invention includes the use of an improved protocol for exchanging operational and/or control information between separated digital and analog sections of an xDSL modem. This operational and/or control information preferably includes information relating to real time control settings for circuits located within the analog codec, power management, and the like.

During normal operation, the aforementioned receive and/or transmit signal lines can also be used for carrying control words for use by the xDSL modem, which control words are embedded as part of the normal data stream. As a compromise between flexibility and speed, these control words preferably have either a first or second length. The control word has a start bit, followed by a length indicator bit, and then the set of command bits corresponding to the actual command/data value. Idle bits are transmitted continuously between control words. Unlike prior art schemes, the control words are transmitted asynchronously, therefore, in an embedded operations channel (EOC) that has an effective rate equal to the word clock signal.

According to another useful feature of the present invention, the aforementioned link also includes provision for setting up a multi-channel data frame. In this way, two or more data channels can be set up between the digital controller and analog section, with data transferred through a first channel during a first time period of the multi-channel data frame, and through a second channel during a second time period of the multi-channel data frame. To accomplish this, the word clock signal can be adapted to have a different duration for different number of data channels. In one variation, the data channels can have different transmit and/or receive data rates, so as to accommodate multiple codecs, or unequal receive/transmit data stream bit rates (such as ADSL). Accordingly, the single channel limitation of the prior art can be also be overcome by this capability of the present invention.

Yet another useful aspect of the present invention provides that, due to the unique selection of receive/transmit/clock lines and signal protocols, the same receive and/or transmit signal lines can also be used to support a compatible data interface between the digital controller and an ATM based hardware xDSL modem. In other words, the data path can handle ATM packaged data and clocking information, making it extremely versatile and useful for incorporation within a motherboard application.

These aspects of the present invention thus permit an xDSL motherboard, and an xDSL modem to be configured in a manner similar to a voice-band modem.

A computer motherboard, DSL digital controller, DSL codec, and DSL modem of the present invention include otherwise conventional hardware (and/or software in an HSP application) and are all implemented with appropriate interface circuitry and control logic necessary to effectuate the above architecture, characteristics and functionality of the aforementioned DSL link.

Although the inventions are described below in a preferred embodiment associated with a personal computing system, it will be apparent to those skilled in the art the present invention would be beneficially used in any environment where it is desirable to link separated analog/digital portions of an xDSL modem.

BRIEF DESCRIPTION OF THE DRAWINGS

FIG. 2A is a functional block diagram of a preferred embodiment of a DSL digital link, DSL modem, and motherboard of the present invention;

FIG. 2B is a more detailed functional block diagram of the portions of the circuitry illustrated in FIG. 2A;

FIG. 4 is a preferred embodiment of a signal and timing protocol that can be used by the DSL link of the present invention to support an ATM interface.

DETAILED DESCRIPTION OF THE INVENTION

DSL Modem System Overview

Figure 1A:
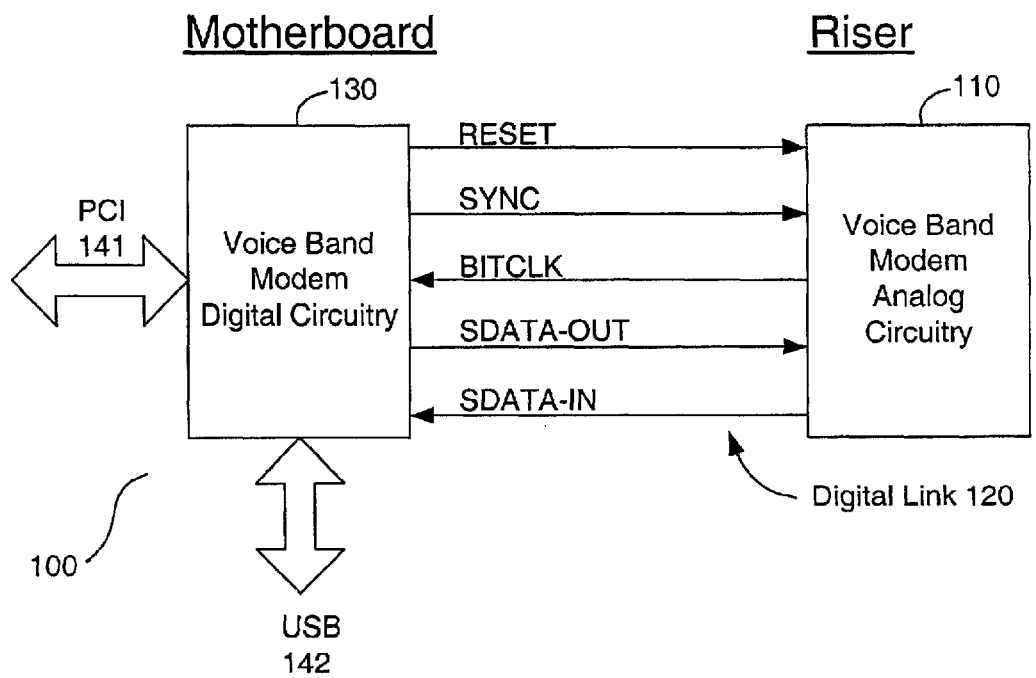
FIG. 1A is a diagram illustrating how an analog portion of a prior art voice band grade modem is mechanically placed in a riser card and electrically connected to a digital portion of such modem integrated into a computer motherboard in a personal computing system
Figure 1B:
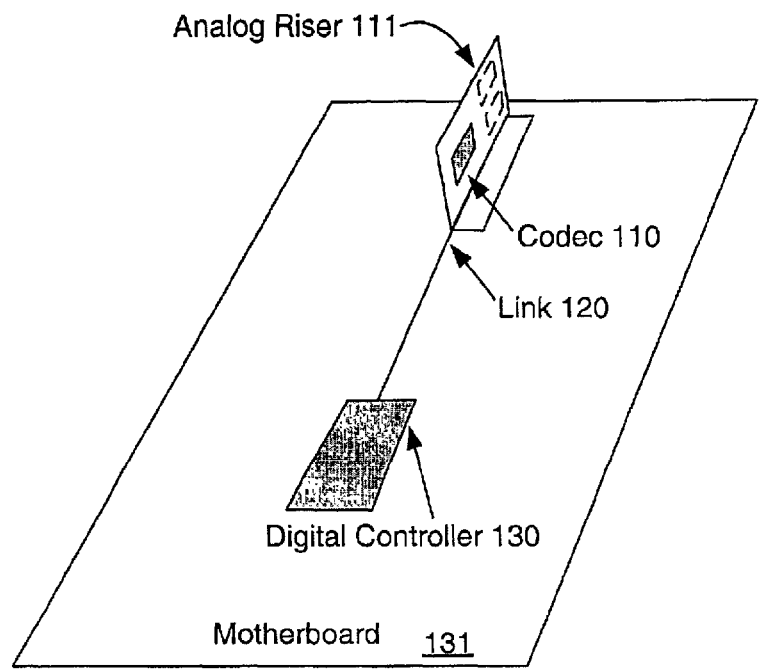
FIG. 1B is an electrical block diagram depicting the various signals carried by a prior art digital link for a voice band grade modem integrated as part of a motherboard in a personal computer system.

A preferred embodiment of the present invention is depicted generally in FIGS. 2A and 2B. This embodiment is similar in some respects to the prior art voice band modem implementation shown in FIG. 1, and, for that reason, like components/circuits are designated with like numerals. In FIG. 2A, an xDSL modem 200 as shown consists of two physically separated (but electrically coupled) circuitry sections, a DSL Modem Analog Circuit 205, and a DSL Modem Digital Circuit 230. Except for those portions necessary for implementing the xDSL digital link of the present invention, the specifics of these two circuitry sections are well known in the art, and any suitable hardware/logic/firmware combination could be used for effectuating the typical functions of an xDSL modem. For example, DSL Modem Analog Circuit 205 is typically a combination of a codec and various analog components necessary to support an xDSL link. It will be apparent to those skilled in the art that portions of DSL Modem Analog Circuit 205, as well portions (or even all) of DSL Modem Digital Circuit 230 may be implemented in single chip (IC) form either alone or in combination with a larger functional device. With reference to FIG. 2A again, DSL Modem Digital Circuit 230 includes circuitry for performing some of the necessary signal processing associated with an xDSL link, data buffering, and host interface functions. Additional control logic sets up and maintains the xDSL compatible data link by responding to appropriate commands from the host. It also receives hardware status such as power loss detection from the DSL Analog Circuit 205 via the DSL link and passes this information forward to the host for necessary actions.

Various software drivers associated with the operating system can interact with DSL Modem Digital Circuit 230 through various available system busses such as a PCI Bus to ensure proper data flow between such circuit and applications running on a host system. In a typical PC system, the functions performed by DSL Modem Digital Circuit 230 is embodied as part of a PCI Bus Controller chipset, such as those known in the art as either South Bridge or North Bridge. The purpose of this integration is to increase system integration flexibility and to reduce BOM costs. Thus, for purposes of the present discussion, DSL Modem Digital Circuit 230 is also generally referred to herein as a DSL Digital IC, and this IC can be integrated alone as a standalone device, or, as noted immediately above, as part of a PCI North/South Bridge IC. In additional to DSL link, this overall chip may contain additional various interfaces such as a PCI bus 241, USB bus 242, and AC-Link 243. Furthermore, it may generate additional control signals such Wake Up to the host for various modem operation needs. Other system controller functions (CPU, memory and PCI agent related) normally performed by such PCI Bus Controller chipset can be implemented in any conventional, well-known fashion.

In general, the hardware, firmware, software, and logic for performing the above functions in DSL Modem Digital Circuit 230 is dependent on the functions performed in DSL Modem Analogy Circuit 205. For example, when oversampling is used in A/D and D/A , the digital filters for interpolation and decimation filters can be done on either side of the DSL link. Therefore, for purposes of the present invention, the actual implementation of DSL Modem Digital Circuit 230 and Digital Modem Analog Circuit 205 can be accomplished through a number of variations that are compatible with the teachings herein. In many cases, as just described in connection with the filtering function, various signal processing or logic operations can be effectuated on either side of the link with no loss of performance or flexibility. The present invention, in fact, specifies a universal DSL link interface that allows a very flexible implementation for the two blocks and for future DSL technologies.

DSL Analog Section Overview

FIG. 2B provides a more detailed electrical schematic illustration of the components shown generally in FIG. 2A. As shown, a DSL Analog Modem Circuit 205 is connected to a phone line through a hybrid circuit 207 and processes the received signal through a receive amplifier 209, filter 211, A/D 213, and, in embodiments where filtering is implemented on this side of the modem, a post digital filter 214. A ring detect circuit 212 is used to detect a remote wake up signal, which is some pre-designated xDSL signal. This wake up signal is passed on where it used, for example, to re-activate portions of the DSL modem and a host PC incorporating the same. A series of transmission counterpart stages are also shown in FIG. 2B, including a digital filter 214' (optional as noted above), D/A circuit 213', and a transmit amplifier and driver stage 211', for generating the xDSL analog transmit signal to the phone line through the hybrid. Also associated with DSL Analog Modem Circuit 205 is a DSL link interface block DSL-A 216, which transmits signals in the DSL link to DSL Digital Modem Circuit 230, and converts received signals in the DSL link to various data and control signals for the internal circuits within DSL Analog Modem Circuit 205, including control registers 215. Also inside DSL-A 216 is a clock circuit (not shown) which generates the necessary clocks for internal blocks and external DSL link based on an input from a System Master Clock as shown. Again, some or all of the functions of DSL Analog Modem Circuit 205 may be grouped and implemented in single chip form. For example, DSL-A codec 218, incorporating control registers 215, DSL-A Interface 216, digital filters 214, 214', and A/D 213 and D/A 213' is preferably embodied in a single integrated circuit (IC), and a separate IC is preferably used to embody analog front end sections (i.e. receive/transmit drivers 209, 209' and receive/transmit filters 211 and 211').

It should be emphasized that the above description is only a typical embodiment of DSL Analog Modem Circuit 205 suitable for use with the present invention, and that other variations of an analog codec circuit will be apparent to those skilled in the art. Other voice modem related functions can also be incorporated in this stage, as noted in the aforementioned Intel specifications noted above.

To improve transmission performance against various noise sources from the PC motherboard and coupled to the components in the analog front end (AFE) section, DSL Modem Analog Circuit 205 can be physically placed in a separate printed circuit board (PCB) or riser card 211. This provides maximum noise isolation from DSL Modem Digital Circuit 230. This approach is similar to that done in the prior art for analog modems. Note that it is not necessary in all cases that DSL Modem Analog Circuit 205 be placed on a separate riser card 211, but it is important that such circuitry be isolated in some fashion so that it is substantially free from electronic noise that could impair its performance. Accordingly, DSL Modem Analog Circuit 205 could conceivably still be mounted on the same motherboard 231 as DSL Modem Digital Circuit 230, so long as the former is sufficiently isolated from other motherboard noise sources. As an example, a small isolating enclosure, shielding cage, or even insulative layer coatings might be used to protect and shield portions of DSL Modem Analog Circuit 205 from EMI and other noise, and this could result in smaller displacements between the analog and digital sections of an xDSL modem. Other appropriate manifestations will be apparent to those skilled in the art.

DSL Digital Section Overview

On the other side of DSL Link 220 is DSL Modem Digital Circuit 230, which includes a counterpart DSL-D Interface 233. As noted earlier, DSL Modem Digital Circuit 230 is preferably implemented as a single DSL Digital IC integrated within a South/North bridge controller within a PC system. The functions performed by this circuit include I/O transfers between a PC host and DSL Analog Circuit 205. Depending on the specific DSL implementation, part of the data pump functions can be done inside Receiver Buffer and Processing 234 and Transmitter Buffer and Processing 234'. For example, DSL functions such as IFFT and FFT can be performed by 234' and 234, respectively. DSL-D Interface 233 interacts with and is responsible for coordinating data/control signals on the digital side of DSL Link 220. As with its counterpart on the analog side, DSL-A Interface 216, this circuit performs data conversion and control signaling via DSL Link 220. To interface with the PC host and various peripheral devices, DSL Digital IC 230 may also include various bus connections and interfaces. These include PCI Bus 241 and associated PCI Bus Interface 238 to the PC host, USB 242 and USB Interface 238' to external USB devices, and AC-Link 243 and DC97 Interface 238" to external audio and analog modem codecs.

Again, it should be mentioned that the above description for the Digital IC 230 is but one typical embodiment for use with the present invention in a PC system, and that other variations of the same will be apparent to those skilled in the art. As noted earlier, some of the functions performed in DSL Digital IC 230 can instead be implemented on the analog side, and vice-versa.

As noted above, functions performed by Transmitter Buffer and Processing 234' and Receiver Buffer and Processing 234 depend on the specific xDSL implementation. In the case of host signal processing, where the present invention can be used for great benefits, only minimal functions need be performed inside 234 and 234'. Instead, most xDSL functions are performed by the host CPU. The degree of integration of such functions by a CPU are, of course, a function of the available MIPs for performing the same. While it is not practical or economical at this time to implement a full rate ADSL data pump with contemporary CPU technologies, it is nevertheless quite possible to achieve reduced rate ADSL functionality (i.e., such as that specified by the proposed ITU-T G.992.2 standard) in a PC in most cases by utilizing the teachings of applicants' prior disclosures, including in Ser. No. 08/884,895 and 08/884,957 which are hereby incorporated by reference. Thus, the hardware needed to implement DSL Digital IC 230 can be extremely inexpensive (simple interface circuitry) and cost-effective for a motherboard manufacturer.

DSL Link Specification/Protocols

A DSL link 220 couples DSL Modem Analog Circuit 205 to DSL Digital IC 230 through DSL-A Interface 216 and DSL-D Interface 233 respectively. This link includes a number of data and control signal lines. Specifically, there are four (4) receive data lines $RX_1$–$RX_4$; four (4) transmit data lines $TX_1$–$TX_4$; a variable rate bit clock signal (CLOCK); a word clock signal (WORD CLOCK) to show the word boundary for each sample; and a reset signal (RESET) from the DSL Digital IC 230 to reset the DSL Modem Analog Circuit 205. These signals are explained in detail below. As can be seen, the applicants have carefully evaluated and calculated an optimal set of data/control lines and signal formatting to minimize the total number of pin assignments and maximize the usability for various xDSL requirements.

Receive data lines $RX_1$–$RX_4$ carry digital samples generated by A/D 213 and assembled and transmitted across the link by DSL-A Interface 216; DSL-D interface 233, conversely dis-assembles and passes these samples on for further signal processing. Unlike prior art audio modem codecs, which utilize a single receive data line, the present invention makes use of four parallel lines. This comes from a compromise between the single line prior art approach (which minimizes the number of pin assignments but requires a high clocking rate) and a fully parallel approach (which minimizes the clock rates but requires more driving power and a higher pin count). This compromise approach has the following advantages: (1) since xDSL signals are broadband signals, it minimizes clock frequencies and consequently device power consumption, (2) it reduces the total pin count to an acceptable level, (3) it provides an embedded channel for control signaling (explained shortly), and (4) enables various features such as using the same DSL link 220 as a logically equivalent Utopia interface (explained shortly).

For the same reasons, four (4) transmit data lines $TX_1$–$TX_4$ carry digital samples from DSL Modem Digital Circuit 220 assembled by DSL-D Interface 233 into suitable form where they are then received and dis-assembled by DSL-A Interface 216 and processed by D/A converter 213' in DSL Modem Analog Circuit 205 to generate the analog transmit xDSL signal. Signal line RESET is activated when the PC host tries to reset DSL Modem Analog Circuit 205; this can occur, for example, when the xDSL modem must be initialized or re-initialized.

Signal line CLOCK carries a scalable rate clock signal, $f_{clock}$ generated by the clock generator inside DSL-A 216, which can be any suitable and well-known conventional clocking circuit. For a given xDSL link of signal frequency bandwidth B, oversampling factor P, up to 15 bits per sample, $f_{clock}$ is given by:

$$f_{clock}=2*B*P*16/4$$

In a preferred embodiment, a sample word consists of 16 bits: 1 control bit and up to 15 sample bits. Therefore, the period of the signal line WORD CLOCK consists of four (4) serial clock periods. That is, $$f_{WC}=f_{clock}/4$$

Unlike the prior art fixed clock rate signaling, the clock signal rates for CLOCK and WORD CLOCK will vary depending on the particular DSL link in place. The present DSL Digital Communication Link 220 does not impose any restriction on the clock rate, since it is expected that such should be scalable in a manner that supports a wide range of potential options for an xDSL modem in a personal computing system. In other words, this variability for the clock rate provides system motherboard manufacturers with the ability to mix and match compatible combinations of digital and analog xDSL modem components without concern about the available clocking rate across the connecting interface. This optimizes options for both motherboard suppliers, and. xDSL modem component vendors, since they only need to ensure that they are matching combinations of hardware that are otherwise compatible. For example, in an ADSL modem application, the T1.413 issue 2 standard calls for a full downstream (Nyquist) sampling rate of 2.2 MHz, where the signal bandwidth B is 256 tones*4.3125 kHz/tone=1.1 MHz. With P being 4× oversampling, CLOCK and WORD CLOCK are 35.328 and 8.832 MHz, respectively. The only important consideration, therefore, is to make certain that the particular DSL Digital IC 230 can support this clock rate in conjunction with the selected DSL Modem Analog Circuit 205. In this respect, therefore, DSL Digital Communications Link 220 supports a scalable clock rate that is based purely on the desired price and performance objectives of a system vendor. To flexibly adjust the clock rates, the external Master clock can be divided by a programmable value specified in a register inside DSL-A Interface 216, which can be set up by the host through the control channel embedded in the DSL Link 220 (explained shortly).

To reduce the total pin count in DSL Link 220, the same CLOCK and WORD CLOCK are used by the corresponding interfaces (DSL-A 216 and DSL-D 233) for both transmit and receive data.

Figure 3A:
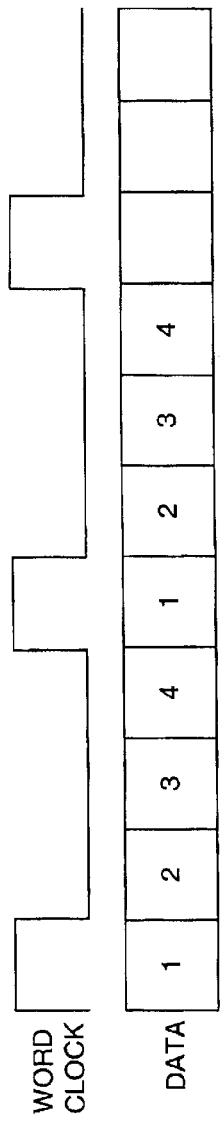
FIGS. 3A–3C are preferred embodiments of timing specifications, data formatting, and control signal protocols used in the DSL link of the present invention.

The word clock rate, $f_{wc}$, provides timing for transmit and receive data samples. As illustrated generally in FIG. 3A, each pulse in the WORD CLOCK represents the beginning of a sample word. As shown, four sampling CLOCKs are used in a word period. This allows up to 16 bits (4 lines*4 cycles) per sample word. In a typical DSL application, a high speed codec will not require more than 15 bits per sample. Accordingly, the present scheme accommodates even the expected worst case for an xDSL modem by setting 16 bits per WORD CLOCK period, in which at least one of these bits can be designated for control signaling. Of course, while the preferred embodiment herein utilizes the specified clocking format discussed above, and an accompanying set of four data transmission lines, other combinations of these parameters will be apparent to those skilled in the art from the present teachings. Accordingly, the present invention is not limited to any one particular combination of such parameters.

As mentioned above, the present invention also provides capability for communicating operational and/or control information easily and flexibly between the analog and digital sections of modem 200. This can be seen in FIG. 3B which illustrates how at least one operational control bit (D15) is reserved or allocated for an embedded operation channel (EOC). The EOC can be used, for example, for passing the following types of information across the link:

(1) transmitter/receiver gains,;
(2) interrupts to the Digital IC 230;
(3) information to control VCXO in DSL Modem Analog Circuit 205 for timing recovery;
(4) power management information, such as an ADSL wake-up signal, or a power loss signal received by DSL Digital IC 230 from the motherboard. The power loss signal from the motherboard, in the case of ADSL, is used by DSL Modem Digital Controller 230 for generating a dying gasp message to be transmitted to a remote transceiver through DSL Modem Analog Circuit 205. Other types of control information associated with a conventional xDSL link can also be accommodated.

Figure 3B:
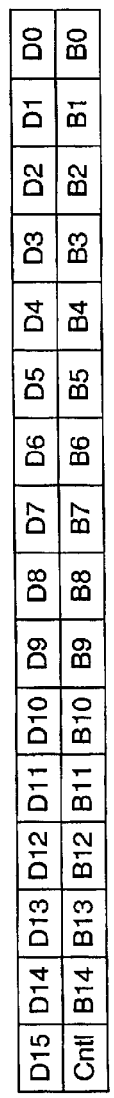

It can be observed from FIG. 3B that EOC has an effective bit rate equal to the word clock. The present invention, therefore, provides a method for providing control signaling information that does not require a separate time division multiplexed control word sent over the link as is done in the aforementioned AC97 prior art data link. This operational information is encoded by DSL-D Interface 233 into the data stream using any suitable logic, and is then decoded and acted upon by corresponding logic in DSL-A Interface 216 so that, for example, suitable adjustments are made to digital filters 214, 214', A/D 213, D/A 213', and amplifier and filter stages 209, 209' and 211, 211' respectively. This operational information can be passed in both directions across the link so that control registers 215 within DSL Analog Circuit 205 can be read or configured in any desired manner by DSL Digital IC 230. Conversely, if desired, information concerning data and settings of control registers 235 within DSL Digital IC can be monitored and changed by control logic in DSL Analog Circuit 205.

Preferably, control information (i.e., control data or control data addressing) in the EOC is presented in asynchronous form in a manner analogous to that used in a conventional PC serial port or RS232 to simplify logic design. This means that a start bit is set to logical 0 when there is control data, and logical 1 otherwise. After the start bit, a fixed number ($1+N_c$ or $1+2 N_c$) of control bits fills out the remainder of the control word signal. To optimize the balance between short control words (to minimize delays) and long control words (improved addressing range), two different control word lengths are provided (i.e., the control word length is either $N_c$ or $2N_c$). To signal a short control word (say $N_c$=16 bits), the bit immediately following the start bit is set to a logical 0; to signal a long control word (say 32 bits) the bit immediately following the start bit is set to a logical 1. Following the set of bits for the actual control word, the EOC is then stuffed with all logical 1 values, corresponding to idle bits. Because the above architecture is relatively flexible, it is of course possible (and may be desirable in some environments) to increase the number of embedded operation channels by using an additional bit (for example D 14) of the transmit/receive data words across the link.

Additional Features in DSL Link

Variable Number of DSL Channels

Another useful aspect of the present invention is the provision in the present xDSL digital link for a variable number of channels. The aforementioned AC97 prior art can only handle a fixed number of channels (12) in the transmit/receive directions, and this is not practical for an xDSL link for a number of reasons. First, the receiving and transmitting data streams may not be operating at the same sampling clock. This will occur, for example, when there are different oversampling ratios, or where there are different signal bandwidths (e.g., ADSL) for upstream and downstream transmissions. Second, there may be multiple channels for transmission and receive directions. For instance, an echo cancellation data path might be used in some environments for echo suppression. Finally, it may be useful to support additional DSL Modem Analog Circuits 205', 205", (not shown) connected in parallel with DSL Modem Analog Circuit 205 using the same set of data signal, control and clock lines described above.

Figure 3C:
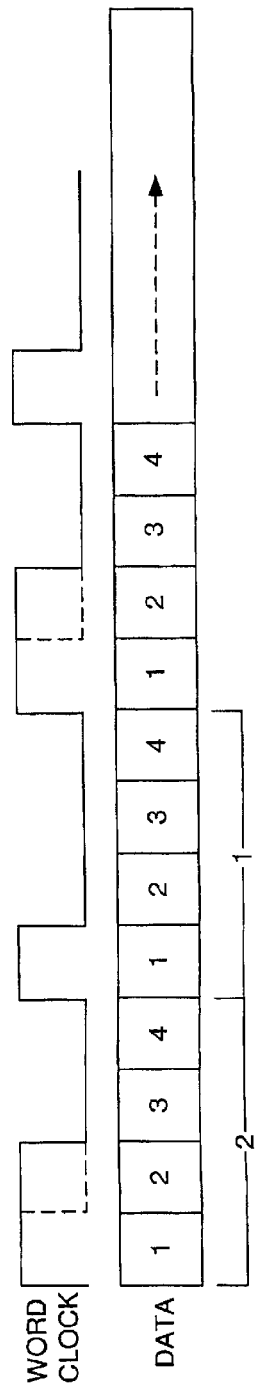

To achieve this variable number of channels capability, a frame structure for the word clock cycles is illustrated in FIG. 3C. As illustrated, a certain number M (programmable by software and set to a value of 2 as shown) of word clock cycles forms a frame clock to support M separate DSL channels (or separate analog circuits) in each direction. It is unnecessary, of course, for all M channels to be active at one time. To mark the beginning of a frame, the word clock is held high for a duration of two clock cycles. At startup, M is initially set to 1. To operate with multiple channels, DSL Digital IC 230 passes a control signal via the EOC noted earlier, to set M to some higher integer value in the DSL Modem Analog Circuit 205, such as M=2. A multi-channel frame is then indicated by WORD CLOCK being set high for two clock cycles. As depicted in FIG. 3C, the data for channel 2 (or the second DSL Modem analog circuit) is presented at the beginning of the frame cycle (i.e., when WORD CLOCK is high for two cycles) and the data for channel 1 (or the first DSL Modem analog circuit) is presented during the second half of the frame cycle (during the time WORD CLOCK is high for a single cycle). Thus, in the multi-channel data frame of FIG. 3C, there are two data channels, and data is transferred through a first channel during a first time period of the multi-channel data frame, and through a second channel during a second time period of the multi-channel data frame.

In this manner, multiple codecs can be included in DSL Modem Analog Circuits 205. As is apparent, the value for M can be programmed as necessary by DSL Digital IC 230 based on the particular DSL link requirements, the specific implementation of DSL Modem Analog Circuits 205, etc.

Furthermore, when the bit rates at the output of Digital Filters 214 and 214' have an integer relationship, the provision of multiple channels is a necessary feature. For example, in the case of ADSL where the sampling rates equal the Nyquist rates, the upstream and downstream rates are 275 kHz and 2.2 MHz, respectively (a ratio of 1:8). Therefore, the present invention allows a DSL modem to be configured with a value of M=8, thus setting up only one active channel in the upstream direction and 8 active channels in the downstream direction.

The various clocks, buffers, latches, control logic, etc., for implementing this aspect of the present invention, as well as for performing the formatting, assembling, and disassembling operations on the Rx and Tx data samples by the various DSL-A and DSL-D interfaces are well-known in the art, and therefore any suitable combination of the same which effectuates the above functionality can be used for the present invention.

Reuse of DSL Link for External Hardware DSL Implementation

As mentioned earlier, the use of DSL Link 220 is most attractive to a host based DSL modem implementation requiring minimal logic inside Digital IC 230. When the CPU in the motherboard is not fast enough, it is desirable to use the DSL Link to connect Digital IC 230 to an external hardware DSL implementation. In this case, another useful aspect of the present invention is illustrated in FIG. 4. As shown, when an external hardware solution for a DSL modem implementation exists, a reasonable interface to use with such implementation is one based on the ATM Utopia I or Utopia II interface. This is because ADSL technology has already been defined to interface with ATM in both T1.413 Issue 2 and ITU-T G.992 standards. In this configuration, DSL Digital IC 230 would be linked through DSL Digital Link 220 to a hardware based xDSL modem in FIGS. 2A and 2B, instead of interfacing directly to DSL Analog Modem Circuit 205. In such instance, of course, since most of the signal processing and control functions would be located within the hardware xDSL modem, DSL Digital Controller 230 could be simplified accordingly. The reason this is possible is because the same 10 signal lines described above ($RX_1$–$RX_4$, $TX_1$–$TX_4$, CLOCK and WORD CLOCK) can serve a dual purpose and act as an ATM interface as well. As above, for the same four sampling cycles per word clock, the following data can be transported over DSL digital link 220:

1. First clock cycle period: $RX_1$–$RX_4$ are used for Control, 0, RxClav, TxClav; $TX_1$–$TX_4$ are used for Control, 0, RxEnb and TxEnb.
2. Second clock cycle period: $RX_1$–$RX_4$ are used for RxSoc, RxAddr [2:0], while $TX_1$–$TX_4$ are used for TxSoc, TxAddr [2:0].
3. Third clock cycle period: $RX_1$–$RX_4$ are used for RxData [7:4], while $TX_1$–$TX_4$ are used for TxData [7:4].
4. Fourth clock cycle period: $RX_1$–$RX_4$ are used for RxData [3:0], while $TX_1$–$TX_4$ are used for TxData [3:0].

As defined above, the signals Control, RxClav, TxClav, RxEnb, TxEnb, RxSoc, TxSoc, RxAddr, and TxAddr are defined in the UTOPIA Specification, Level 1, Version 2.01, published Mar. 21, 1994 by the ATM Forum, and incorporated by reference herein. It can be seen from the above that an ATM type interface can also be implemented by the DSL-A and DSL-D interfaces to exploit the embedded control channel characteristics of the present digital link with great advantage.

One significant advantage of the present invention, therefore, is the fact that the DSL Digital Link 220 can be incorporated within a motherboard of a personal computing system to enable great flexibility in configuring options for an xDSL communications capability. For example, a motherboard manufacturer (or ultimate system vendor) can configure any particular base level enabled system to include any desired level of xDSL modem performance and functionality, including either a host based soft modem solution, or a pure hardware type modem solution. This is accomplished by simply stuffing the board with various combinations; for example, a simplified version of DSL Digital Controller 230 can be combined with an ATM based hardware DSP xDSL modem, or, alternatively, a configuration such as shown in FIG. 2B can be implemented for a software modem implementation. The flexibility of the data lines of the communications link, and the use of an embedded control channel, permits easy adoption of optimized solutions for any particular application.

Thus, the configuration and selection of the data signal lines, the use of an embedded control channel, the data clocking mechanism, the ability to provide multiple data channels, and the format of control words used in the embedded control channel, all contribute to making the present invention easily adaptable and usable with a number of different combinations of digital and analog circuits associated with xDSL modems.

Although the present invention has been described in terms of a preferred embodiment, it will be apparent to those skilled in the art that many alterations and modifications may be made to such embodiments without departing from the teachings of the present invention. Accordingly, it is intended that the all such alterations and modifications be included within the scope and spirit of the invention as defined by the following claims.

What is claimed is:

1. A method of implementing a digital communications link connecting a digital controller section of an xDSL modem, located on a system motherboard of a computing system, to a separate analog section of the xDSL mode adapted to be substantially free of electronic noise from other electronic components on the motherboard which could significantly affect the overall operation of such xpSL modem, said method comprising the steps of:

(a) providing a plurality of receive signal lines for communicating data from a remote xDSL modem;
(b) providing a plurality of transmit signal lines for communicating data to the remote xDSL modem;
(c) providing a bit clock signal line separate from said plurality of receive signal lines and said plurality of transmit signal lines for carrying a bit clock signal, which bit clock signal is generated by scaling a separate clock signal useable by the xDSL modem, such that said bit clock is variable to accommodate a plurality of different xDSL transmission protocols.

2. The method of claim 1, further including a step: providing a reset signal to reset the analog section of the xDSL modem.

3. The method of claim 1, wherein at least four (4) signal lines are used for said receive signal lines, and at least (4) separate signal lines are used for said transmit signal lines.

4. The method of claim 1, further including a step of providing a word clock signal, which word clock signal has a cycle consisting of at least four (4) bit clock cycles, with the first cycle being a first value and the remaining cycles being a second value.

5. The method of claim 1, wherein said receive and/or transmit signal lines can also be used for implementing an embedded operation channel within said receive and/or transmit signal lines, said embedded operation channel consisting of control signals embedded in both transmit and receive directions for use by the xDSL modem.

6. The method of claim 4, wherein at least one (1) bit per word clock cycle is used to carry control signals.

7. The method of claim 5, wherein each control signal can have a first or a second length.

8. The method of claim 5, wherein each control signal begins with a start bit, is followed by a length bit, then by a set of command bits, and then idle bits are sent between control signals.

9. The method of claim 1, further including a step: providing a multi-channel data frame during a plurality of consecutive bit clock periods based on said bit clock signal, said multi-channel data frame having at least two data channels, and wherein data is transferred through a first channel during a first time period of said multi-channel data frame, and through a second channel during a second time period of said multi-channel data frame, and further wherein said first and second time period occur within said plurality of consecutive bit clock periods.

10. The method of claim 9, wherein the number of channels in the multi-channel data frame is programmable.

11. The method of claim 9, wherein said plurality of consecutive bit clock periods consists of at least four (4) bit clock cycles for each channel.

12. The method of claim 11, wherein the boundary of each multi-channel data frame is indicated by a separate word clock signal having a first predetermined value at the frame beginning and a second predetermined value in the rest of the frame.

13. The method of claim 1, wherein said receive and/or transmit signal lines can also be used to support a data interface between said digital controller and a hardware or DSP based xDSL modem.

14. The method of claim 13, wherein the data interface is logically equivalent to a Utopia I and/or II interface and said hardware or DSP based xDSL modem also can perform an ATM transport convergence (TC) function.

15. The method of 14, wherein an embedded operation channel (EOC) is used to control proper operations of the hardware or DSP based xDSL modem.

16. The method of claim 1, wherein said separate clock signal is based on a master clock external to the xDSL modem and operated at a frequency required by the digital communications link.

17. A method of implementing a digital communications link within a personal computer system, comprising the steps of:

(a) providing a plurality of receive signal lines, said receive sign lines being configurable such that data can be received by a digital controller from both an analog codec and an ATM interface;
(b) providing a plurality of transmit signal lines, said transmit signal lines being configurable such that data can be transmitted by a digital controller to both the analog codec and the ATM interface:
(c) providing a clock signal line, said clock signal line carrying a clock signal adapted for data transfers associated with both the analog codec and the ATM interface:
(d) providing a data transfer protocol such that data transfers over said digital communications link can include codec samples and/or ATM cell data; wherein said clock signal further can be varied to accommodate a plurality of different data transfer protocols used in the digital communications link.

18. The method of claim 17, wherein said ATM interface is logically equivalent to an ATM Utopia I and II interfaces.

19. The method of claim 17, wherein the digital controller is located on a system motherboard of the personal computer system, and said analog codec is located at a position which is substantially free of electronic noise from other electronic components on said motherboard which could materially affect the operation of such analog codec.

20. The method of claim 17, wherein said digital communications link supports a plurality of data channels by time division multiplexing data transfers using a frame signal related to said clock signal.

21. The method of claim 17, wherein operational and/or control information for said analog codec can be embedded in data frames communicated through the plurality of receive and transmit signal lines.

22. In a motherboard for use in a personal computing system and which system is configured to treat a high speed xDSL capable modem as a motherboard device, the improvement comprising:

(A) a digital controller associated with the high speed modem, said digital controller being located physically on the motherboard and including:
  [i] circuitry for processing xDSL formatted data and control signals; and
(B) an analog front end circuit associated with the high speed modem, said analog front end circuit being electrically coupled but physically separated from said digital controller, said analog front end circuit including:
  [i] line interface circuitry for coupling to a data channel carrying analog data signals corresponding to said xDSL formatted data and control a signals; and
  [ii] circuitry for performing A/D and D/A operations on said analog data signals and xDSL formatted data and control signals respectively; and (C) a digital interface for coupling said digital controller and analog front end circuit, said digital interface including:
  [i] a plurality of xDSL data receiving lines; and
  [ii] a plurality of xDSL data transmitting lines; and
  [iii] a clock signal adapted for an xDSL compatible link, said clock signal being generated by scaling a separate clock signal useable by the xDSL capable modem, such that said clock signal is variable to accommodate a plurality of different xDSL transmission protocols; and wherein said digital interface supports an xDSL compatible data link between said digital controller and said analog front end circuit.

23. The motherboard of claim 22, wherein said analog front end circuit is located on a riser card which is configured to be mounted substantially perpendicular to the motherboard.

24. The motherboard of claim 22, wherein said digital controller is controlled in part in software by a host processor located on the motherboard.

25. The motherboard of claim 22, further wherein said digital interface uses a multi-channel data frame, said multi-channel data frame having at least two data channels, and wherein data is transferred through a first channel during a first time period of said multi-channel data frame, and through a second channel during a second time period of said multi-channel data frame.

26. The motherboard of claim 22, wherein said receive and/or transmit signal lines can also be used to support an Asynchronous Transfer Mode (ATM) interface.

27. The motherboard of claim 26, wherein said ATM interface is a Utopia I and/or II interface.

28. A method of transmitting data over an xDSL digital communications link between a digital controller portion of an xDSL modem and an analog codec portion of the xDSL modem, comprising the steps of:
  (a) selecting an xDSL transmission protocol to be used in the xDSL digital communications link; and
  (b) configuring a bit clock to accommodate transmission requirements said selected xDSL transmission protocol, said bit clock being generated by scaling a separate clock signal useable by the xDSL modem; and
  (c) communicating data between the digital controller portion of the xDSL modem and the analog codec portion of the xDSL modem across the xDSL digital communications link using said bit clock; and
  (d) transmitting a frame of data across the xDSL digital communication link, said frame of data occupying a plurality of consecutive bit clocks;
  wherein said bit clock is variable to accommodate a plurality of different xDSL transmission protocols, and wherein said frame of data is transmitted by dividing said frame of data over multiple communications lines.

29. The method of claim 28, wherein said separate clock signal is a master clock signal used by the xDSL modem, and said bit clock is derived by dividing said master clock signal by a value specified for said xDSL transmission protocol.

30. The method of claim 29, wherein said value specified for said xDSL transmission protocol is programmed and stored in a register of the analog codec portion of the xDSL modem.

31. The method of claim 28, wherein the xDSL digital communications link is embodied as a bus located on a motherboard of a personal computer system.

32. The method of claim 28, wherein said bit clock is used for both receive and transmit data.

33. The method of claim 28, further including a step: (e) generating a word clock based on said bit clock for communicating data words between the digital controller portion of the xDSL modem and the analog codec portion of the xDSL modem across the xDSL digital communications link, said word clock having a period equal to a plurality of bit clock periods.

34. The method of claim 28, wherein said frame of data is signaled by a word clock being held in an active state for more than one bit clock period.

35. The method of claim 28, wherein said xDSL transmission protocols include Asymmetric Digital Subscriber Loop (ADSL) protocols.

36. The method of claim 28, wherein said data includes digital samples generated by an analog to digital converted forming part of the analog codec portion of the xDSL modem, and said digital samples are processed by a host signal processing circuitry to support the xDSL modem.

37. The method of claim 36, wherein said host signal processing circuitry includes a FFT circuit embedded in a digital controller as well as software executing on a host processor.

38. The method of claim 28, wherein said data includes Asynchronous Transfer Mode (ATM) based data cells, and said ATM based data cells are processed by a hardware based signal processor to support the xDSL modem.

39. The method of claim 28, wherein step (c) is performed by the analog codec portion of the xDSL modem which is located on a separate board from the digital controller.

40. The method of claim 28, wherein said bit clock can have a frequency exceeding 35 Mhz.

41. A digital communications link connecting a digital controller section of an xDSL modem located on a system motherboard of a computing system, to a separate analog section of the xDSL modem adapted to be substantially free of electronic noise from other electronic components on the motherboard which could significantly affect the overall operation of such xDSL modem, the digital communications link comprising:
  (a) a plurality of receive signal lines for communicating data received by the analog section from a remote xDSL modem to the digital controller:
  (b) a plurality of transmit signal lines communicating data received by the analog section from the digital controller to the remote xDSL modem;
  (c) a bit clock signal line, separate from said plurality of receive signal lines and said plurality of transmit signal lines, for carrying a bit clock signal to clock transfers between the analog section and the digital controller;
  wherein said bit clock signal has a variable frequency that can be set to accommodate a plurality of different xDSL transmission protocols.

42. The digital communications link of claim 41, wherein said bit clock can have a frequency exceeding 35 Mhz.

43. The digital communications link of claim 41, wherein said bit clock signal is generated by the separate analog section of the xDSL modem on a modem riser card.

44. The digital communications link of claim 41, wherein the digital controller section is incorporated within a motherboard for a computer system.

45. A communications protocol for transmitting data over a digital communications link within a computer system between a digital controller and an analog coder/decoder (CODEC), the protocol comprising the steps of:
  (a) generating a bit clock adapted for data transmission requirements of the digital communications link;

(b) generating a separate frame signal for indicating a boundary for a variable sized data frame transmitting the data between the digital controller and the analog CODEC;

(c) supporting a scaleable data rate in the digital communication link by adjusting a clock rate of said bit clock and/or a size of said variable sized data frame;

wherein said size of said variable sized data frame is adjusted by changing a number of active data channels used in the digital communications link.

46. The communications protocol of claim 45 wherein said clock rate is varied in accordance with an xDSL transmission standard used in the digital communications link.

47. The communications protocol of claim 45 wherein said number of active data channels can be varied in both a transmit and receive direction in the digital communications link.

48. The communications protocol of claim 45 wherein said number of active data channels is programmed by the digital controller.

49. The communications protocol of claim 45 wherein said number of active data channels is used to support a plurality of separate communication links with a plurality of respective separate analog codecs.

50. The communications protocol of claim 45 wherein said frame signal is based on a word clock signal, said word clock signal being used for clocking a sample data word from an analog to digital (A/D) converter in the CODEC.

51. An input/output (I/O) circuit for supporting a communications link over a computer bus used within a computer system between a digital controller and an analog coder/decoder (CODEC), the I/O circuit, including: a digital communications interface including;

1) a plurality of receive lines for receiving data; and 2) a plurality of transmit lines, separate from said plurality receiving lines, for transmitting data;
wherein the data is transferred in parallel across said plurality of receive lines and said plurality of transmit lines in accordance with the bus protocol;

3) a bit clock signal line, separate from said plurality of receive signal lines and said plurality of transmit signal lines, for carrying a bit clock signal adapted for a transmission protocol supported by the bus protocol;

4) a frame clock signal line for carrying a frame clock sign adapted for clocking a variable sized data frame in accordance with the bus protocol, said variable sized data frame having a size based on a number of active channels in the plurality of separate data channels and/or desired data rate;

wherein said plurality of receive lines, said plurality of transmit lines, said bit clock signal line and said frame clock signal line support the bus protocol as part of the communications bus within the personal computer system.

52. The I/O circuit of claim 51 wherein a clock rate of said bit clock signal is varied in accordance with an xDSL transmission standard used in the digital communications link.

53. The I/O circuit of claim 51 wherein said size of said variable sized data frame is adjusted by changing a number of active data channels used in the digital communications link.

54. The I/O circuit of claim 53 wherein said number of active data channels can be varied in both a transmit and receive direction in the digital communications link.

55. The I/O circuit of claim 53 wherein said number of active data channels is programmed by the digital controller.

56. The I/O circuit of claim 53 wherein said number of active data channels is used to support a plurality of separate communication links with a plurality of respective separate analog CODECs.

57. The I/O circuit of claim 51 wherein said frame signal is based on a word clock signal generated by the digital interface, said word clock signal being used for clocking a sample data word from an analog to digital (A/D) converter in the CODEC.

58. A method of communicating data over a data link connecting a first integrated circuit located on a first circuit board and a second integrated circuit located on a second circuit board, the method comprising the steps of:

(a) communicating first transmit data from the first integrated circuit to the second integrated circuit over the data link using a first transmission channel;

(b) communicating first receive data from the second integrated circuit to the first integrated circuit over the data link using a first receive channel, said first receive channel and said first transmission channel being separate;

(c) clocking data transmissions in said first transmission channel and/or said first receive channel over the data link using a scaleable clock signal;

(d) setting up a second transmission channel and a second receive channel over the data link between the first integrated circuit and a third integrated circuit to support second transmit data and second receive data respectively using said scaleable clock signal;

wherein said scaleable clock signal is adjusted for the data link between the first integrated circuit and the second integrated circuit so that the data link uses a scaleable clock rate to support a data transfer rate required for said first transmission channel and/or said first receive channel.

59. The method of claim 58 wherein said scaleable clock signal is a bit clock used in both said first transmit channel and said first receive channel.

60. The method of claim 58 wherein said data link is set up over a computer bus located on the first circuit board.

61. The method of claim 58 further including a step time division multiplexing control information and data over said first transmission channel so as to provide control information from the first integrated circuit to said second integrated circuit as part of said data transmission, said control information including a power management signal including at least a wake-up signal and/or a power down signal.

* * * * *